United States Patent
Killick

(10) Patent No.: US 9,769,538 B2
(45) Date of Patent: Sep. 19, 2017

(54) SYSTEMS AND METHODS FOR CONTENT DELIVERY

(71) Applicant: COX COMMUNICATIONS, INC., Atlanta, GA (US)

(72) Inventor: Ray Killick, Alpharetta, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 466 days.

(21) Appl. No.: 13/716,682

(22) Filed: Dec. 17, 2012

(65) Prior Publication Data

US 2014/0173025 A1     Jun. 19, 2014

(51) Int. Cl.
    G06F 15/16        (2006.01)
    H04N 21/6587      (2011.01)
    H04N 21/266       (2011.01)
    H04N 21/414       (2011.01)
    H04N 21/462       (2011.01)

(52) U.S. Cl.
    CPC ....... *H04N 21/6587* (2013.01); *H04N 21/266* (2013.01); *H04N 21/41407* (2013.01); *H04N 21/462* (2013.01)

(58) Field of Classification Search
    CPC .............. G06F 17/30846; H04L 51/00; H04N 21/6587; H04N 21/266; H04N 21/41407; H04N 21/462
    USPC ................. 709/217, 219, 223, 225, 227, 228
    See application file for complete search history.

(56) References Cited

U.S. PATENT DOCUMENTS

| | | | |
|---|---|---|---|
| 6,785,720 B1* | 8/2004 | Seong ........................... | 709/220 |
| 7,877,705 B2* | 1/2011 | Chambers et al. ........... | 715/835 |
| 2004/0122949 A1* | 6/2004 | Zmudzinski ...... | G06F 17/30899 709/225 |
| 2007/0192684 A1* | 8/2007 | Bodin ............... | G06F 17/30035 715/234 |
| 2009/0199245 A1* | 8/2009 | White et al. .................... | 725/78 |
| 2010/0033438 A1* | 2/2010 | Fu .......................... | G08C 23/04 345/173 |
| 2011/0052144 A1* | 3/2011 | Abbas .................. | G11B 27/034 386/240 |
| 2012/0050185 A1* | 3/2012 | Davydov ............ | G06F 3/04883 345/173 |
| 2012/0204093 A1* | 8/2012 | Habarakada et al. ........ | 715/234 |
| 2013/0212287 A1* | 8/2013 | Chappelle ............... | H04M 3/58 709/227 |
| 2013/0332706 A1* | 12/2013 | Tanaka ...................... | G06F 9/00 712/220 |
| 2014/0032636 A1* | 1/2014 | Nelson ............... | H04N 21/2343 709/203 |

* cited by examiner

*Primary Examiner* — Viet Vu
(74) *Attorney, Agent, or Firm* — Eversheds Sutherland (US) LLP

(57) ABSTRACT

Systems and methods for redirecting content from a first user device to a second user device is disclosed. The first user device may generate a redirection request message and transmit the redirection request message to a video back office server. The redirection request message may contain information pertaining to the user device to which the content is to be redirected and information related to a current session of the rendering the content. The video back office server may instantiate a redirection of the content to the second user device based at least in part on the received redirection request message.

20 Claims, 7 Drawing Sheets

SYSTEMS AND METHODS FOR CONTENT DELIVERY

TECHNICAL FIELD

This invention generally relates to methods, systems, and apparatus for delivery of content.

BACKGROUND

Media content, such as audio and video, may be delivered to subscribers of media services, such as cable television subscribers, via a communications network, such as a cable television network. In such systems, a content delivery network, or a network of various servers, may provide the media content to a user device, such as a set top box at a subscriber location. In some cases, the media content may be delivered via the Internet, such as in a streaming format, and in other cases the media content may be delivered via legacy cable systems, such as via one or more quadrature amplitude modulation (QAM) based channels.

Users may have multiple user devices that are capable of viewing the media content that may be provided to the user. These user devices associated with a particular user may render content in a variety of different formats and may receive the content in a variety of different mechanisms, such as via the Internet, in a particular format, or at a particular bit rate.

BRIEF DESCRIPTION OF THE FIGURES

Reference will now be made to the accompanying drawings, which are not necessarily drawn to scale, and wherein.

DETAILED DESCRIPTION OF EMBODIMENTS OF THE DISCLOSURE

Figure 1:
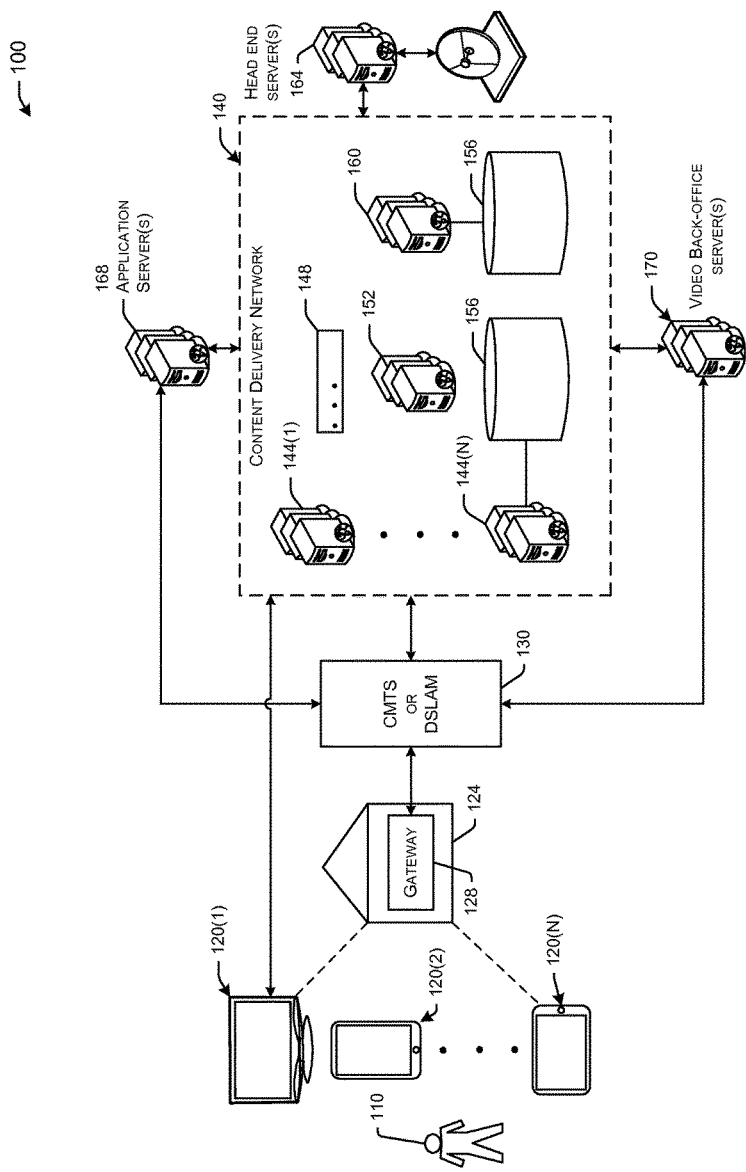
FIG. 1 is a simplified schematic diagram illustrating an example content distribution architecture that may be operated in accordance with embodiments of the disclosure.

Embodiments of the disclosure are described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

In accordance with embodiments of the disclosure, providers and/or distributers of content may use a variety of suitable mechanisms to deliver the content, such as via streaming or via traditional cable television systems to one or more user devices. The providers and/or distributers of the content may be, for example, cable television operators, telecommunication system operators, satellite dish network operators, or the like. The content distributer may access, own, and/or operate a content delivery architecture, or portions thereof, to deliver content to one or more user devices associated with a user. As used herein, the term "content" may include, but is not limited to any variety of suitable analog and/or digital content such as movies, television shows, video games, other video content, metadata, application code, music, other audio content, olfactory content, haptic content, other digital content, combinations of the foregoing, and the like.

Certain embodiments, as disclosed herein, may include systems and methods for transmitting content between the content distributer and multiple user devices via the content distribution architecture. In some cases, the user device may be a managed user device, such as a set top box (STB) for cable television distribution. These managed user devices may be controlled, at least in part, by the content distributer. Signals distributed to the managed devices may include any variety of suitable signals, such as cable broadcast signals or video on demand (VOD) signals of any suitable type of modulation mechanisms, such as quadrature amplitude modulation (QAM), and any variety of transmission protocols. In the same or other cases, the user device may be an unmanaged user device, such as a laptop computer for content rendering. Signals distributed to the unmanaged devices may include any variety of suitable signals, such as streaming media signals of any suitable variety of transmission protocols, such as HTTP live streaming (HLS), via any variety of channels and/or networks, such as the Internet.

The streaming may be enabled by one or more servers providing programming segments to the user device. In this case, the user device may be an unmanaged user device. Alternatively, managed user devices, such as Internet Protocol STB (IP_STB). Therefore, the streaming media may be segmented into a plurality of segments and the user device may receive each of the segments in a logical or sequential order to provide the viewer with the media content.

Embodiments of the disclosure may provide apparatus, systems, and methods for providing a content to a user on a user device associated with the user and responsive to a user request, redirect and/or transfer the content to another user device associated with the user. For example, a user may watch a movie on a tablet computing device and request the rendering of the movie to be redirected to a television associated with the user.

Certain embodiments of the disclosure may include a user device that may render a content provided by the content distributer. The user device may include one or more applications and/or software that may be executed by one or more processors of the user device that configures the user device to identify other available user devices associated with the user, generate a redirection request message based at least in part on user input, and transmit the redirection request message to one or more entities associated with the content distributor, such as a video back office server. The user device may be configured to receive an indication from the user, such as by user interaction with the user device, that the user may want to redirect the content. In some cases, the user device may identify other available user devices associated with the user by accessing a look up table that identifies each of the available other user devices. In other cases, the user device may receive a message and/or beacon from other user devices, such as by communicating with and/or pinging those other potentially available user devices. In yet further cases, the user device may generate and transmit a message to the video back office server to request an indication of available user devices associated with the user.

Once the user device identifies other available user devices to which the currently rendered content may be transferred, the user device may provide an indicia of the available other user devices to the user. When providing the indicia of the other available user devices, the user device may pause the rendering and/or playing of the currently rendered content. The user device may further receive an indication of a selection of one of the available other user devices for which corresponding respective indicia have been displayed to the user. For example, if a video clip is played on a user's television, and the user indicates that he/she wants to redirect the video to another user device, the television may identify the user's other user devices, such as a smartphone and a laptop computer. The television may further pause the video clip and display on its screen an icon representative of the user's smartphone and another icon representative of the user's laptop computer. The user may select one of the smartphone or the laptop computer, such as by selecting with a remote control associated with the television. Upon selection of one of the icons, the user device may identify the device associated with the selection.

The user device may identify one or more information associated with the current rendering of the content when the user indicates an intent to redirect the content. The user device may further be configured to generate a redirection request message based at least in part on the user selection of the other user device and the one or more information associated with the current rendering of the content on the user device. Upon generation of the redirection request message, the user device may transmit the redirection user message to a video back office server, via a variety of suitable communicative links and protocols, such as digital storage media command and control (DSM-CC), real time streaming protocol (RTSP), or hypertext transfer protocol (HTTP). Continuing with the prior example, consider that the user selects the smartphone icon from the television screen. The television and one or more processors of the television may then identify the selection as the smartphone. In this case, the device type of the smart phone may be identified. In some cases, the smartphone may be uniquely identified using an identifier associated with the smartphone. The television may further generate one or more information associated with the content being rendered on the television. This information may be related to the current session on the television. The information may include, for example, the title of the video clip, a unique identifier of the video clip, the currently view location of the video, volume settings of the television, brightness settings of the television screen, or the like. Upon identifying the information associated with the content and the selection of the smartphone, the television may generate a redirection request message. The redirect usage message may indicate the user's desire to redirect the video from his/her television to his/her smartphone.

The redirection request message may be received by the video back office server and one or more processors thereon via one or more communicative links. The video back office server may analyze the redirection request message and ascertain the one or more information associated with the current session and the selected destination user device. The video back office server may access a profile associated with the indicated destination user device type. The profile may be stored on the video back office server or on a profile database that may be accessible by the video back office server. The profile associated with the selected destination user device may include information related to various aspects of how content is to be provided to the selected destination user device. This destination device information may include the aspect ratio of the destination device screen, the acceptable bit rate of the content stream, a level of volume sensitivity relative to the current user device, a level of brightness sensitivity relative to the current user device, or the like.

The video back office server may use the current session information, the information related to the destination device, and the identity of the user device to instantiate directing the content to the destination device. The content provided to the destination user device may, in certain embodiments, be a different format than the format of the content provided to the initial user device. In this case, the video back office server may determine the format of the content needed for the destination device based at least in part on the destination user device information from the destination user device profile. The video back office server may identify and provide the information related to the format of the content needed for the destination device to a content delivery network, or elements thereof, associated with content delivery architecture and the content delivery entity. In one aspect, the information of the current session and the destination device format may be provided to a content server, an edge server, and/or other servers of the content delivery network. Alternatively, the information of the current session and the destination device format may be provided to an origin server or other elements at or near a head end of the content delivery network and/or an application server.

The video back office servers providing the content delivery network allows the content delivery network to provide the content to the destination user device in a format appropriate for the destination user device. Therefore, the content may be transferred to the selected destination user device from the content delivery network. The formatting of the content for the destination user device may include providing the content in any one or more of a suitable aspect ratio, resolution, refresh rate, transmission/bit rate, content buffering level, or the like. The content delivery network may further provide the content in the appropriate location and/or settings based at least in part on the current session information. Therefore, the content may be delivered to the destination user device from the point, or relatively near the point, in the content where the redirection of the content was requested by the user. In some cases, in addition to bookmarking the point where redirection is requested, information associated with volume, brightness, and/or other content rendering settings may be provided to the destination user device. The destination user device may receive this content rendering information in the form of metadata associated with the content, such as in the form of one or more data packets. The destination device may in certain embodiments, seamlessly set one or more content rendering settings based at least in part on the content rendering setting information.

In certain embodiments, the current session with the content rendered on the current user device may be discontinued. Therefore, in these embodiments, the content may be rendered on the selected destination user device, but not on the user device where the content was initially rendered after a redirection of the content. In other embodiments, the content may be rendered both on the current user device as well as, the destination user device. Therefore, the current user device and the selected destination user device may both concurrently render the content. In this case, the content rendered on each of the user devices may be in the same or different formats (i.e. aspect ratio, resolution, bit rates, etc).

In certain embodiments, where the content is rendered only on the selected destination user device after redirection, the previous user device that was rendering the content may be used as a remote control for controlling one or more functionality of the destination user device. For example, if content is transferred from a tablet computing user device to a television with integrated set top box (STB), then after the redirection, the tablet computing device may execute one or more applications and/or software that enable the tablet computing device to transmit signals, such as by infrared signals, to control one or more functions of the television, such as audio volume.

Example embodiments of the disclosure will now be described with reference to the accompanying figures.

Referring now to FIG. 1, an example content distribution architecture 100 that may be operated to deliver content to a user 110 in accordance with embodiments of the disclosure is discussed. The content distribution architecture 100 may include one or more user devices 120(1)-(N), collectively or individually referred to herein as user device 120, associated with the user 110. The user devices 120 may be located at a user premises 124 and communicatively coupled via a communicative home gateway 128 to a cable modem termination system (CMTS) and/or digital subscriber line access multiplexer (DSLAM) 130, hereinafter referred to as CMTS 130. The CMTS 130 may provide a communicative connection between the gateway 128 and a content distribution network (CDN) 140. The CDN 140 may include one or more edge servers 144(1)-144(N), one or more routers and/or bridges 148, one or more data center servers 152, one or more content databases 156, and/or one or more content servers 160. The various elements of the CDN 140 may cooperate to receive content from one or more head end servers or origin servers 164 and appropriately cache the content and/or transport the content to a destination, such as the CMTS 130 for distribution to an end user 110 via one or more user devices 120. The one or more origin servers 164 may be communicatively coupled to the CDN 140 and be configured to provide a variety of content to the CDN 140. The content distribution architecture 100 may further include one or more application servers 168 and one or more video back office (VBO) servers 170 that may be communicatively coupled to the user devices 120 via the CMTS 130.

It should be noted that some of the user devices 120 may be managed devices, such as cable set top boxes (STB), televisions with integrated STBs, or satellite signal receiver. Managed devices may have one or more functionality that may be controlled by the content distributer, such as a cable service provider. A managed device may be communicatively coupled directly to the CDN 140, the application servers 168 and/or the video back office servers 170. Content may be provided to the managed devices via a variety of formats and/or channels, such as quadrature amplitude modulated (QAM) signals carried over any variety of communicative link, such as coaxial cables, fiber optic cables, and/or hybrid fiber and coaxial (HFC) cables. The managed user devices may be configured to receive television signals (digital or analog) through the home gateway 128 or directly from the CDN 140. The managed user device may further be equipped with software and/or hardware that encrypts or decrypts content that are transmitted to the devices from the CDN 140. In this case, the managed user devices may receive a scrambled and/or encrypted signal corresponding to the content from the CDN 140 and the managed user devices may be configured to utilize a key to decrypt and/or unscramble the received signal. In case of a multicast transmission, only managed user devices that have access rights to the content may be provided with a decryption key. In this case, user devices 120 that do not have access rights may still receive these multicast signals corresponding to a particular content, but those user devices 120 may not be able to descramble and present the content to the user 110. The managed user device 120 may further receive user specific information from the application server 168 via a communications channel for a variety of functions, such as to authenticate the user device 120, initialize the user device 120, and/or assign content access rights to the user device 120.

Others of the user devices 120 may be unmanaged user devices. These unmanaged user devices may be communicatively linked to the CDN 140 via one or more other elements, such as the gateway 128 and/or the CMTS 130. The unmanaged user devices may have little or no functionality that may be controlled by the content distributer, such as a cable service provider. The unmanaged devices may receive content from the CDN 140 in a variety of mechanisms including, for example, streaming media over the Internet. The gateway 128 may provide access to the Internet to the unmanaged user devices via a variety of suitable mechanisms, such as data over cable service interface specification (DOCSIS). The transmission of content to unmanaged user devices may, in certain cases, be protocol based communications, such as transmission control protocol (TCP), internet protocol (IP), hypertext transmission protocol (HTTP), or the like. In one aspect, the content may be streamed to the user device 120. In another aspect, the content may be provided to the user device 120 in a series of content segments. Therefore, the user device 120 may provide the media content that is desired by the user 110 of the user device 120 by sequentially rendering the segments of the content on an audio/visual output interface of the user device 120. The user device 120 may receive client specific information from an application server via a communications channel. The user device 120 may further request a manifest file from the origin server 164 or other elements of the CDN 140 based at least in part on a user selection of media content. The manifest file request may include the user device 120 and/or user 110 specific information. The origin server 164 may provide one or more manifest files, or mappings of a sequence of media segments, based at least in part on the user specific information. In one aspect, the manifest file request may be transmitted from the user device 120 to the one or more origin servers 164 via the CDN 140. Similarly, the manifest file may also be delivered from the one or more origin servers 164 to the user device 120 via the CDN 140.

The user devices 120 may further be configured to execute instructions and/or applications to identify other user devices associated with the user 110 and display indicia corresponding to the other user devices 120 associated with the user 110 on the display of the user device 120. The user device may further be configured to accept input from the user 110 to select one of the other user devices 120 by user selection of the corresponding indicia associated with the other user device 120. Upon selection of the other user device 120, the current user device 120 may generate a request for redirection message of content from the current user device 120 to the selected user device 120. The request for redirection message may include information associated with one or more of the current user device 120, the user 110, the selected destination user device 120, and/or the current session of rendering the content on the current user device 120. The request for redirection message may be transmitted to the VBO servers 170 for further processing and redirection of content from the current user device 120 to the user 110 selected destination user device 120.

It will be appreciated that while a single user premises 124 is shown, there may be any number of user premises communicatively coupled to the CMTS 130 and/or the CDN 140. For the purposes of this discussion, the one or more user premises 124 may include any variety of locations where content may be consumed by the one or more users 110, including homes, businesses, schools, hospitals, libraries and the like. In one aspect, the one or more user premises 124 may be constrained to a specific geographic area, such as a particular city or state. In other embodiments, the one or more user premises 124 may not have geographic constraints. It will be appreciated that while a single user 110 is shown corresponding to each of the one or more user premises 124, there may be any number of users 110 associated with each of the user premises 124. Furthermore, a particular user 110 may be associated with more than one of the user premises 124. For example, an individual may access content via the CDN 140 from two or more different user premises 124, such as from a home location and from a work location, in accordance with embodiments of the disclosure.

The one or more data center servers 152 may include one or more servers with processing and electronic storage functionalities. Therefore, each of the one or more data center servers 152 may include one or more processors and electronic memories of any suitable variety. In one aspect, the one or more data center servers 152 may route data or media or segments thereof through the CDN 140. In another aspect, the one or more data center servers 152 may interact with the one or more routers 148 to direct data or content or segments of data or content through the CDN 140. In certain embodiments, the one or more data center servers 152 may route media or segments thereof that may be stored on the electronic memory associated with one or more of the data center servers 152 through the CDN 140 to one or more of the user premises 124 via CMTS 130. Each of the one or more data center servers 152 may be geographically distributed at various suitable locations within a covered geography of the CDN 140.

It will be appreciated that the CDN 140 may store media content in relatively closer spatial proximity to the user premises 124 by storing content at the one or more edge servers 144. Therefore, there may be reduced latency in delivery of media content from the CDN 140 to the user premises 124 from the edge servers 144 than from other elements of the CDN 140, such as from the content servers 160. This placement of media content on the edge, or in relatively closer proximity to the user premises 124 may also reduce the requirements for bandwidth in portions of the CDN 140 for the delivery of relatively high quality media content.

In certain other embodiments, the one or more application servers 168 may periodically provide updated user specific information to the user device 120. For example, the one or more application servers 168 may provide updated user specific information to the user device 120 at predetermined times. In one aspect, the one or more application servers 168 provide updated client specific information at different times to different user device 120. In yet another embodiment, the one or more application servers 168 may provide updated user specific information upon turning on or activating the user device 120. For example, consider that a user 110 turns on a set top box to watch television at his/her user premises 124. Upon turning on the set top box, updated user specific information may be sent to the user device 120 from the one or more application servers 168. The user specific information provided by the application servers 168 may be used to authenticate user devices 120 and/or set content rights of particular users 110 and/or associated user devices 120.

The VBO servers 170 may be configured to perform many or all of the functions of the application servers 168 in certain embodiments. Indeed, in certain embodiments, the VBO servers 170 may be the same entities as the application servers 168. In these embodiments, the VBO servers 170 may be configured to authenticate user devices 120 and/or set content rights of particular users 110 and/or associated user devices 120. The VBO servers 170 may further be configured to identify available user devices associated with a particular user 110 and may be able to provide this information of user devices 120 associated to the user 110 to a particular one of the user device 120. The VBO servers 170, therefore may be configured to access an association database to identify user devices associated with the user 110 and may further be configured to determine which one of the identified user devices are available. In other words, the VBO server may be configured to determine which of the user devices are currently turned on and not being used and, therefore, can be used to render content to the user 110 or other individuals associated with the user 110.

The VBO servers 170 may further be configured to receive a redirect request message from a user device 120 that is currently rendering a particular content thereon. From the received redirect request message, the VBO servers 170 may be able to ascertain information related to one or more of a current user device 120, a selected destination user device 120, and the current session of rendering the content on the current user device 120. From this received information, the VBO server 170 may be configured to instantiate a redirection of the content from the current user device 120 to the selected destination user device 120. The redirection may entail the VBO servers 170 providing user device specific formatting and/or current session specific information to the CDN 140 or constituent elements thereof or to the origin servers 164.

In certain embodiments, the user device 120 may be configured to communicate via any variety of mechanisms, such as Wi-Fi, Wi-Fi Direct, or Bluetooth, with the destination user device (e.g., STB/IP TV set). In this case, the destination user device 120 may be configured to receive stream information of the content that the user 110 wants to continue rendering on the destination user device 120. The destination device 120 may then be configured to stop the current stream on the initial user device 120 and request the VBO server 170 for the redirection of the content stream.

Figure 2:
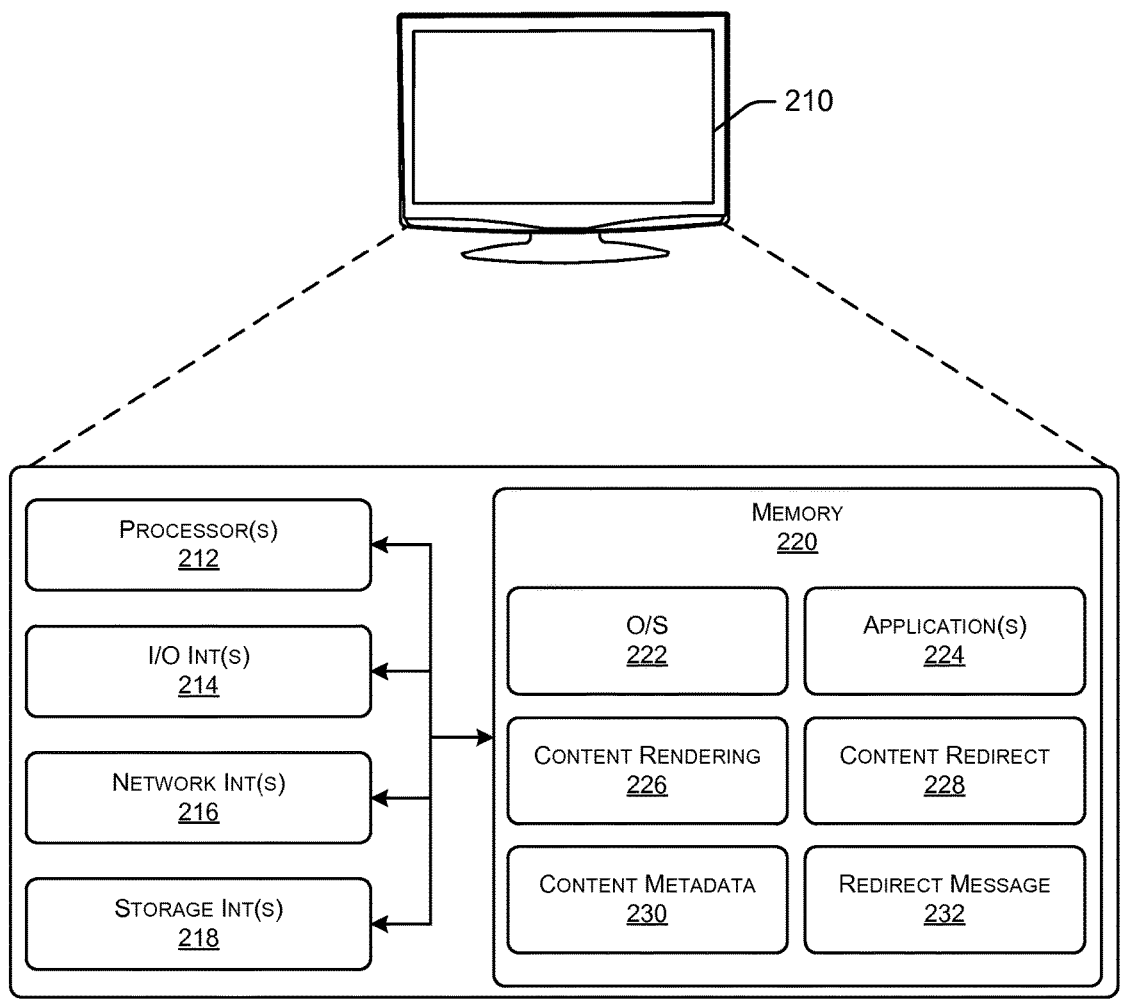
FIG. 2 is a simplified block diagram illustrating a user device of the content distribution architecture of FIG. 1 in accordance with embodiments of the disclosure.

Referring now to FIG. 2 with continuing reference to FIG. 1, a user device 120 of the content distribution architecture 100 in accordance with embodiments of the disclosure is discussed. The user device 120 may include one or more user interfaces and/or input/output (I/O) devices, such as speaker(s), microphone(s), and/or display(s) 210. The user device 120 may include one or more processors 212, one or more I/O device interfaces 214, one or more network interface(s) 216, one or more storage interface(s) 218, and/or one or more memories 220. In some examples, the processors 212 of the user device 120 may be implemented as appropriate in hardware, software, firmware, or combinations thereof. Software or firmware implementations of the processors 212 may include computer-executable or machine-executable instructions written in any suitable programming language to perform the various functions described. Hardware implementations of the processors 212 may be configured to execute computer-executable or machine-executable instructions to perform the various functions described. The one or more processors 212 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The user device 120 may also include a chipset (not shown) for controlling communications between the one or more processors 212 and one or more of the other components of the user device 120. The one or more processors 212 may also include one or more application specific integrated circuits (ASICs) or application specific standard products (ASSPs) for handling specific data processing functions or tasks.

The input/output (I/O) device(s) or user interface(s), such as the display screen 210, may be controlled via the one or more I/O device interfaces 214. The network interfaces(s) 216 may allow the user device 120 to communicate with the CDN 140, directly and/or via the CMTS 130 or the gateway 128. For example, the user device 120 may be configured to communicate with stored databases, other computing devices or servers, user terminals, other devices on the CDN 140 and/or repositories of media content. The storage interface(s) 218 may enable the user device 120 to receive and transmit content or other data to one or more external storage devices.

The memory 220 may include one or more volatile and/or non-volatile memory devices including, but not limited to, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereof.

The memory 220 may store program instructions that are loadable and executable on the processor(s) 212, as well as data generated or received during the execution of these programs. Turning to the contents of the memory 220 in more detail, the memory 220 may include one or more operating systems (O/S) 222, an applications module 224, a content rendering module 226, content redirect module 228, a content metadata module 230, and a redirect message module 232. Each of the modules and/or software may provide functionality for the user device 120, when executed by the processors 212. The modules and/or the software may or may not correspond to physical locations and/or addresses in memory 220. In other words, the contents of each of the modules 222, 224, 226, 228, 230, 232 may not be segregated from each other and may, in fact be stored in at least partially interleaved positions on the memory 220.

The operating system module 222 may have one or more operating systems stored thereon. The processors 212 may be configured to access and execute one or more operating systems stored in the operating system module 222 to operate the system functions of the electronic device. System functions, as managed by the operating system may include memory management, processor resource management, driver management, application software management, system configuration, and the like. The operating system may be any variety of suitable operating systems including, but not limited to, Google® Android®, Microsoft® Windows®, Microsoft® Windows® Server®, Linux, Apple® OS-X®, or the like. The application module 224 may contain instructions and/or applications thereon that may be executed by the processors 212 to provide one or more services to the user. These instructions and/or applications may, in certain aspects, interact with the operating system module 222 and/or other modules of the user device 120.

The content rendering module 226 may have stored thereon instructions and/or programs that when executed by the processors 212, may enable the user device 120 to perform a variety of functions associated with rendering content on the user device 120. In one aspect, the processors 212 may be configured to display video on the screen 210 based at least in part on a received content. In another aspect, the processors 212 may be configured to provide sound from one or more speakers associated with the user device 120 based at least in part on the received content. The content, such as media files, may be of any suitable form, including data files, image files, video files, audio files, or combinations thereof.

In one aspect, the processors 212 may be configured to receive the content from any suitable location, such as from a variety of elements of the CDN 140. For example, if the user device 120 is a managed device, such as a STB, the content may be received directly from the CDN 140. The content may be in a legacy format and may be either a broadcast and/or multicast transmission or a media on demand (MOD) transmission. In the latter case, the user 110 may select the MOD content and it may be provided to the user device 120 in an asynchronous manner relative to other consumers of the same content.

If the user device 120 is an unmanaged device or a managed user device, the content may be received by the user device 120 in the form of streaming content. The content received by an unmanaged user device 120 or an IP-based managed user device 120 may be in the form of adaptive bit rate (ABR), variable bit rate (VBR), constant bit rate (CBR), guaranteed bit rate, or the like. In this case, the user device 120 and the processors 212 thereon may receive a playlist or manifest file that indicates segments of content, and addresses thereof, that comprise the content to be rendered. The user device 120 and the processors 212 thereon may utilize the manifest file to receive and/or retrieve the appropriate segments of content from the CDN 140 and/or the origin server 164. The format of the streaming content may include any suitable format, including, but not limited to, Apple® hypertext transmission protocol (HTTP) Live Streaming (HLS)®, Microsoft® Silverlight Smooth Streaming (SS)®, Adobe® HTTP Adaptive Streaming (HDS)®, Moving Picture Expert's Group (MPEG)® Dynamic Adaptive Streaming with HTTP (DASH)®, or combinations thereof. The manifest file may be periodically updated and/or replaced on the user device 120 while the content is rendered on the user device 120. This may be done to update locations where constituent segments of content may be found on the CDN 140. Additionally, the segments may be updated based at least in part on the available bandwidth and latencies in various portions of the content delivery architecture 100. The particular segments of a content that is selected for a particular user device 120 may be based at least in part on various information related to the user device 120, such as display aspect ratio, resolution, bit rate, processing capability, etc. In certain cases, high bit rate and high quality media files and/or segments may be transmitted via the CDN 140 to the user device 120 that is suited to receive the high bit rate files in a streaming fashion. In certain embodiments, the user device 120 may fetch the segments of the content as prescribed in the manifest file and render them on the user device 120. In certain further embodiments, the user device may buffer the content segments on the user device 120 such as by storing one or more segments, or portions thereof, in memory 220.

The processors 212 may, by executing instructions stored in the content rendering module 226, further provide session related functionality, such as ability to pause, play, stop, fast forward, or reverse the content. This functionality may further be provided when a user wants to redirect content from the current user device 120 to another user device 120.

The content redirect module 228 may have stored thereon instructions and/or programs that when executed by the processors 212, may enable the user device 120 to perform a variety of functions associated with redirecting content from the user device 120 to another user device 120. In one aspect, the processors 212 may be configured to identify one or more other user devices 120 associated with the same user 110. This identification may be performed locally at the user device 120 by accessing a database and/or look up table of associated user devices from memory 220 or a remote storage location. In certain embodiments, the identification of the device may be based at least in part on information provided previously by the user 110 of the device 120. In other cases, the user device 120 may ascertain the information of associated user devices 120 to which content may be redirected by communicating with other user devices 120 in its vicinity. For example, the user device 120 may send out a beacon to receive a signal from other user devices in its vicinity and upon receiving indication of the presence of one or more other user devices, ascertain the availability of those user devices 120 to render content. In certain other embodiments, the user device 120 and the processors 212 thereon may be configured to transmit a request to the VBO servers 170 for identification of other user devices 120 associated with the user 110. Responsive to the request for identification of other user devices 120, the user device 120 may receive a listing of other available user devices 120 associated with the same user 110. In certain further embodiments, the user device 120 may be configured to subscribe to presence information from other user devices 120 within its privileged region and/or group (i.e., other user devices 120 it is authorized to redirect the content to and/or the user devices 120 authorized to render the content.)/in yet further embodiments, the user device 120 may be configured to provide stream information to the destination device 120, which may request appropriate format information from the VBO servers 170, and thereby, tuning information or a master index and/or manifest file to tunes away and/or download content segments automatically.

Once the processors 212 determine other user devices 120 associated with the same user 110 as the user device 120, the processors may be configured to display indicia, such as icons, indicative of each of the available other user devices 120 to which the content may be redirected. Furthermore, the processors 212 may be configured to accept input from the user 110 on the user device 120 of a selection of one of the available user devices 120 by the user 110 by interacting and/or selecting one of the indicia displayed on the user device 120. Upon receiving the user input of the selection of a user device 120 for redirecting content, the user device 120 may identify one or more information on the current session. The current session, as used herein, may refer to the rendering of the content on the current user device 120. The information of the current session may include a bookmark of the content or otherwise the point to which the user 110 has experienced the content or the point to which the content has been rendered on the user device 120. For example, if a particular movie is rendered on the user device 120 and the user 110 chooses to pause the movie at point 1:06:42 (1 hour, 6 minutes, and 42 seconds in to the movie) to redirect the content to another device, then the processors 212 may mark 1:06:42 as the redirect point of the content from the current session. Other session related information may include volume settings, brightness settings, or a variety of other settings that may be particular to the current session of rendering the content on the user device 120.

The content metadata module 230 may have stored thereon instructions and/or programs that when executed by the processors 212, may enable the user device 120 to generate metadata based on the current session. This metadata may be based at least in part on the information generated by the processors 212 by executing the instructions stored in the content redirect module 228.

The redirect message module 232 may have stored thereon instructions and/or programs that when executed by the processors 212, may enable the user device 120 to generate and transmit a redirect request message. The processors 212 may be configured to generate the redirect request message based at least in part on information associated with the current session and the identification of the selected user device to which the content is to be directed. The redirect message may be in the form of one or more data packets and may carry the information associated with the current session, such as metadata indicative of information related to the current session. The redirection request message may further include information related to the user 110 selection of the destination user device 120 from among the choice of available user devices 120 associated with the user 110. In some cases, the redirect message may include information associated with an account of the user 110. The redirection request message may be transmitted to the VBO server 170 via the gateway 128 and/or the CDN 140.

It will be appreciated that there may be overlap in the functionality of the instructions stored in the content rendering module 226, content redirect module 228, content metadata module 230, and redirect message module 232. In fact, the functions of the aforementioned modules 226, 228, 230, 232 may interact and cooperate seamlessly under the framework of the user device 120. Indeed, each of the functions described for any of the modules 226, 228, 230, 232 may be stored in any module 226, 228, 230, 232 in accordance with certain embodiments of the disclosure. Further, in certain embodiments, there may be one single module that includes the instructions, programs, and/or applications described within the content rendering module 226, content redirect module 228, content metadata module 230, and redirect message module 232.

Figure 3:
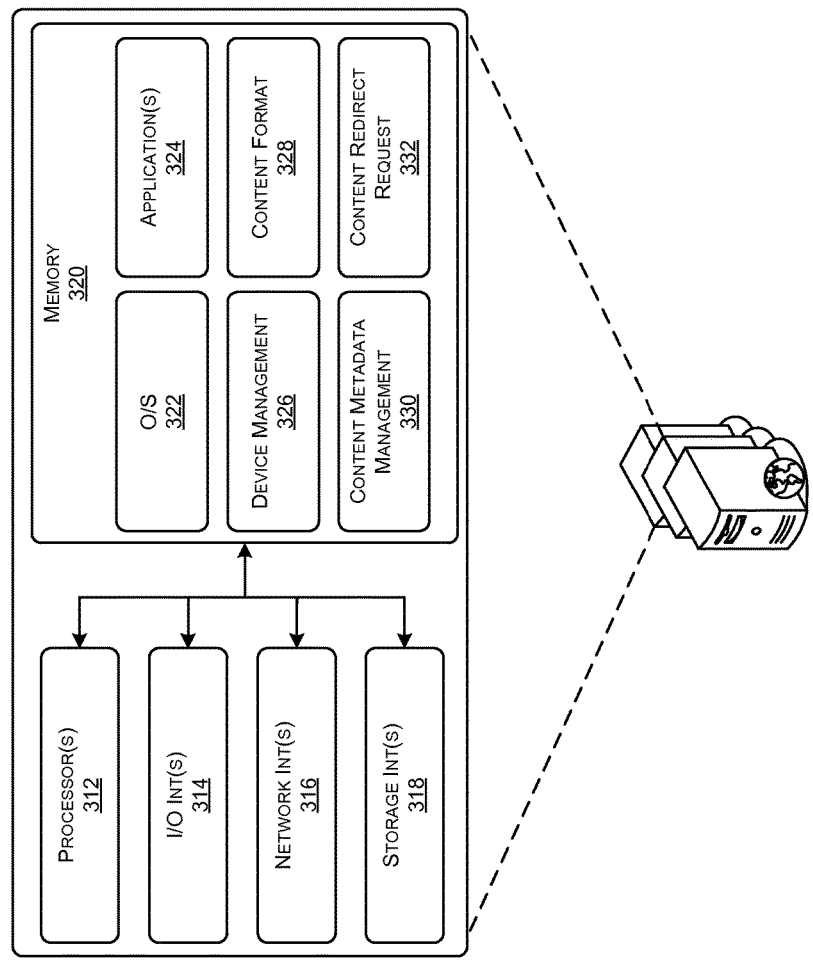
FIG. 3 is a simplified block diagram illustrating a video back office server of the content distribution architecture of FIG. 1 in accordance with embodiments of the disclosure.

Referring now to FIG. 3 with continued reference to FIG. 1, the video back office (VBO) server 170 of the content distribution architecture 100 in accordance with embodiments of the disclosure is discussed. Similar to the user device 120 as described in reference to FIG. 2, the VBO server 170 may include one or more processors 312, one or more I/O device interfaces 314, one or more network interface(s) 316, one or more storage interface(s) 318, and/or one or more memories 320. The one or more processors 312, one or more I/O device interfaces 314, one or more network interface(s) 316, one or more storage interface(s) 318, and one or more memories 320 of the VBO server 170 may be similar to the corresponding components 212, 214, 216, 218, respectively, of the user device 120, and in the interest of brevity, the descriptions of these elements 312, 314, 316, and 318 will not be repeated here.

Turning to the contents of the memory 320 in more detail, the memory 320 may include one or more operating systems (O/S) 322, an applications module 324, a device management module 326, a content format module 328, a content metadata management module 330, and a content redirect request module 332. Each of the modules and/or software may provide functionality for the VBO servers 170, when executed by the processors 312. The O/S module 322 and the applications module 324 of the VBO servers 170 may be similar to the corresponding modules 222, 224, respectively, of the user device 120, and in the interest of brevity, the descriptions of these elements 312, 314, 316, and 318 will not be repeated here.

The device management module 326 may have stored thereon instructions and/or programs that when executed by the processors 312, may enable the VBO servers 170 to manage various aspects of user devices 120 that may be associated with a particular user 110. The processors 212 may, in one aspect, be configured to identify available user devices 120 associated with a particular user 110 by accessing a database to ascertain user devices 120 that may be available to the user 110 and then determining if those user devices 120 are currently available to the user 110. In one aspect, the database to determine potentially available user devices may be constructed based at least in part on information that may be provided by the user 110. Once the potentially available user devices 120 associated with the user 110 are identified, the processors 312 may attempt to communicate with the potentially available user devices 120 to determine if the potentially available user devices 120 are indeed available to accept a redirection of content to render to the user. The communication with the potentially available user devices 120 may entail transmitting a beacon to each of the user devices and receiving responses from each of the available user devices responsive to the transmitted beacon. This response message may indicate, first that the potentially available user device is turned on or in standby mode to accept content, and if the potentially available user device 120 is currently engaged in a function that precludes it from being used to render content to the user 110. For example, the response may indicate that the potentially available user device may be currently engaged in rendering other content and, therefore, may not be available to accept redirected content to render to the user 110.

Once the processor 312 determines which user devices 120 associated with a particular user 110 are currently available for accepting a redirection of content, the processors 312 may communicate this indication of available user devices 120 to one of the user devices 120 associated with the user 110, such as a user device 120 that requests information pertaining to other user devices associated with the user 110. In some cases, the user device 120 that requests information from the VBO servers 170 associated with other devices 120 that may be available to accept content may be a user device that is at that point in time rendering content that is provided by the CDN 140. As an alternative, user devices 120 may indicate and/or publish their presence and/or availability to render content. Additionally, user devices 120 may subscribe to this publication and/or listing of presence and/or availability to ascertain which other user devices are available for rendering content.

The content format module 328 may contain instructions that when executed by the processors 312 may allow the processors to manage and/or access a database of user device related information. The user device related information may pertain to the format of content that may be rendered on each of the user devices 120 that may be associated with the user 110. For example, this information may include aspect ratio for the display of the user device 120, the resolution of the display of the user device 120, the bit rate capabilities of the user device 120, and a variety of other settings and/or parameters pertaining to each of the user devices 120 associated with the user 110.

The content metadata module 330 may have stored thereon instructions and/or programs that when executed by the processors 312, may enable the VBO servers 170 to receive and manage session related information provided by a user device 120 from which a redirection request message is received. This session data may pertain to specifics of the current session of rendering the content on the current user device 120. For example, the session related information may include a bookmark to indicate the point in the content to which the content has already been rendered to the user 110 on the current user device. The session related data may also include information, such as in the form of metadata that indicates current audio volume settings, current screen brightness settings, or any variety of other settings associated with rendering the content on the current user device 120.

The content redirect request module 332 may have stored thereon instructions and/or programs that when executed by the processors 312, may enable the VBO servers 170 to instantiate a redirection of content from a first user device 120 to a second user device 120. The content may be redirected from a user device 120 from which a redirection request message is received to a user device 120 associated with the user 110 and indicated in the received redirection request message. The processors 312, by executing instructions in the content redirect request module 332, may be configured to receive a redirection request message from a current user device 120. The redirection request message may be received in the form of one or more data packets. The data packets may contain, amongst other things, a payload containing identification and/or routing information for the selected destination user device 120, the current user device 120 and/or user 110 information, current session related information. The one or more data packets may further include header information for routing the data packets to the VBO servers 170 and one or more transmission integrity checks, such as a parity bit or a cyclic redundancy check (CRC). The data packets may be received and parsed by the one or more processors 312 at the one or more VBO servers 170 and the payload may be extracted by the one or more processors 312 and pertinent information, such as destination user device 120, whether the content will continue to be provided to the current user device 120, and/or session related information, may be identified. The processors 312 may further use the receive information, in conjunction with format information and session level information as analyzed and/or identified by the processors 312 by executing the instructions in modules 328, 330, to instantiate a redirection of the content. In one aspect, the processors 312 may provide the information associated with the current content rendering session on the current user device 120 and the formatting for the redirection of the content. This information may be communicated to one or more elements of the CDN 140 and/or the origin servers 164. The origin servers 164 and/or the CDN 140 may provide the content to the selected destination user device 120 upon receiving instructions from the VBO servers 170 to provide the content to the destination device. In some cases, the current user device 120 may continue receiving the content in addition to the destination user device 120. In other cases, the current device 120 may stop receiving the content upon the redirection of the content to the destination user device 120.

It will be appreciated that there may be overlap in the functionality of the instructions stored in the device management module 326, content format module 328, content metadata management module 330, and content redirect request module 332. In fact, the functions of the aforementioned modules 326, 328, 330, 332 may interact and cooperate seamlessly under the framework of the VBO servers 170. Indeed, each of the functions described for any of the modules 326, 328, 330, 332 may be stored in any module 326, 328, 330, 332 in accordance with certain embodiments of the disclosure. Further, in certain embodiments, there may be one single module that includes the instructions, programs, and/or applications described within the device management module 326, content format module 328, content metadata management module 330, and content redirect request module 332.

Figure 4:
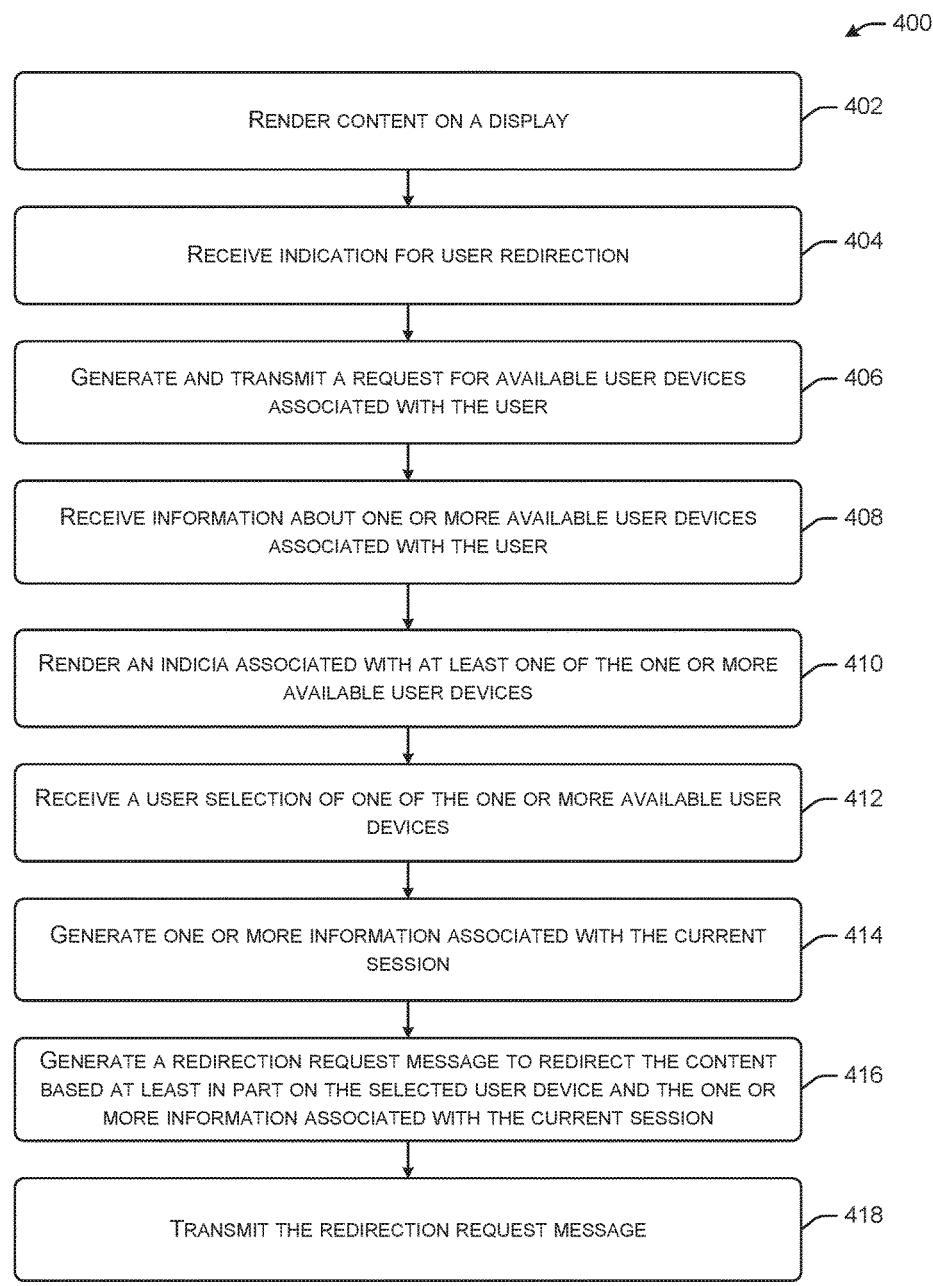
FIG. 4 is a flow diagram illustrating an example method for requesting a redirection of content from one user device to another user device in accordance with embodiments of the disclosure.

Referring now to FIG. 4, an example method for requesting a redirection of content from one user device to another user device in accordance with embodiments of the disclosure is disclosed. Generally, the procedures of this method may be performed by the first and/or current user device 120 from which the content is to be redirected. At block 402, a particular content is rendered on the user device 120. This content may be provided by the CDN 140 to the first user device 120, either directly, in the case of a managed user device, or via the gateway 128, in the case of an unmanaged user device. The content may be in the form of audio files and may be rendered via one or more speakers of the first user device 120. The content may be in the form of images and may be rendered on a display screen 210 of the first user device 120. Further still, the content may be in the form of an audio/video (A/V) file and may be rendered via both one or more speakers and the display screen 210 of the first user device 120.

At block 404 an indication of redirection may be received by the first user device 120 and the processors 212 thereon. The indication of redirection may be received as a signal initiated by the user 110 by interacting with an I/O device, such as a touch sensitive screen or remote control, of the first user device 120. For example, the intent to redirect the content currently being rendered on the first user device 120 may be conveyed to the first user device 120 by the user 110 by pressing a particular button on a remote control. Responsive to this indication, the processors 212 of the first user device 120 may execute instructions and/or applications that may cause the first user device to further interact with the user 110 to execute the redirection of the content.

At block 406, responsive to receiving an indication for redirection, a request for available user devices associated with the user may be generated and transmitted. This request may be transmitted to the VBO servers 170 or other entities of the content delivery architecture 100. The request may include one or more of an indication of the identity of the first user device 120 and the identity of the user 110. Upon receiving the request for available user devices 120 associated with the user 110, the VBO servers 170 may identify and transmit a response that includes an identification of user devices 120 that are associated with the user 110. At block 408, the information about the one or more available user devices associated with the user may be received. This information may be received by the first user device 120 from the VBO servers 170.

It will be appreciated that the processes of block 406 and 408 may be optional. The user devices 120 associated with the user 110 may be identified by mechanisms other than requesting the information from the VBO servers 170. For example, a local database of other devices 120 associated with the first user device 120 may be stored on the first user device 120, such as on the memory 220, or may be accessible by the first user device 120. As another example, the first user device may identify other user devices 120 that may be associated with the user 110 by broadcasting a wireless beacon and/or signal to which other user devices 120 in the vicinity of the first user device 120 may respond with information, such as presence, location, and/or an affiliation to the user 110. This information may in part be used to identify other user devices 120 associated with the user 110 to which content may be redirected.

At block 410, indicia associated with at least one of the one or more user devices may be rendered. The rendering, in certain illustrative embodiments, may be in the form of displaying an icon representative of the available user device 120 associated with the user 110 on the display screen 210 of the first user device 120. In other embodiments, the indicia of the other user devices 120 may be in the form of audio rendered by one or more speakers of the first user device 120 to which the user 110 may respond. At block 412, a user selection of the one or more available user devices may be received. This selection may be performed by the user 110 by selecting one of the indicia as rendered by the first user device 120. For example, if icons representing the other user devices 120 are displayed on the screen 210 of the first user device 120, then the user may select one of the displayed indicia, such as by using his/her remote control or by touching one of the icons if the screen is a touch sensitive display screen. When the user 110 interacts with the first user device 120 and indicates an indicia of another user device 120 to which the content should be directed, the first user device may register the other user device 120 corresponding to the selected indicia as the selected other user device 120.

At block 414, one or more information associated with the current session may be generated. The information associated with the current session may be information that allows for seamless rendering of the content on the selected user device 120 so that one or more of the settings and/or location within the content is preset with little or no user interaction. For example, the current session information may include information about how much of the content has already been rendered. This information may be useful so that the content, when rendered on the selected device may be rendered from or near the point to which it has already been rendered on the first user device 120. Other information associated with the current session may include a variety of rendering settings, such as the volume level, the screen brightness, or other suitable user device 120 settings.

At block 416, a redirection request message to redirect the content based at least in part on the selected user device and the one or more information associated with the current session may be generated. The redirection request message may include a variety of informational elements, such as the identity of the first user device 120, the identity of the corresponding user 110, the identity of the selected destination user device 120, a variety of current session information, such as the portion of the content that has already been rendered on the first user device 120, or the like. The redirection request message may be generated by the processors 212 by aggregating each of the informational elements that may be included in the redirection request message. At block 418, the redirect request message may be transmitted. The redirection request message may be transmitted to the VBO servers 170, the application server 164, or elements of the CDN 140 in the form of one or more data packets. In addition to the aforementioned session and user device related information, the one or more data packets may further contain routing information for the destination, such as the VBO servers 170 and one or more transmission integrity checks, such as a parity bit or a cyclic redundancy check (CRC).

In certain embodiments, particularly when content is redirected from an unmanaged user device 120 and is no longer rendered on the unmanaged user device 120, the unmanaged user device 120, or the first user device 120, may be configured to provide remote control capabilities to control content provided to the destination user device 120. For example, once the content has been redirected to the destination user device 120, the first user device 120 from which the content was redirected may execute an application that provides a user interface with which the user 110 may interact to control the rendering of the content on the destination user device 120. This user interface may, for example, allow the user 110 to pause, stop, play, fast forward, or reverse the content on the destination user device. Additionally, the user interface may allow the user 110 to set various settings on the destination user device 120, such as the volume, brightness, contrast, or other suitable settings.

It should be noted, that the method 400 may be modified in various ways in accordance with certain embodiments of the disclosure. For example, one or more operations of method 400 may be eliminated or executed out of order in other embodiments of the disclosure. Additionally, other operations may be added to method 400 in accordance with other embodiments of the disclosure.

Figure 5:
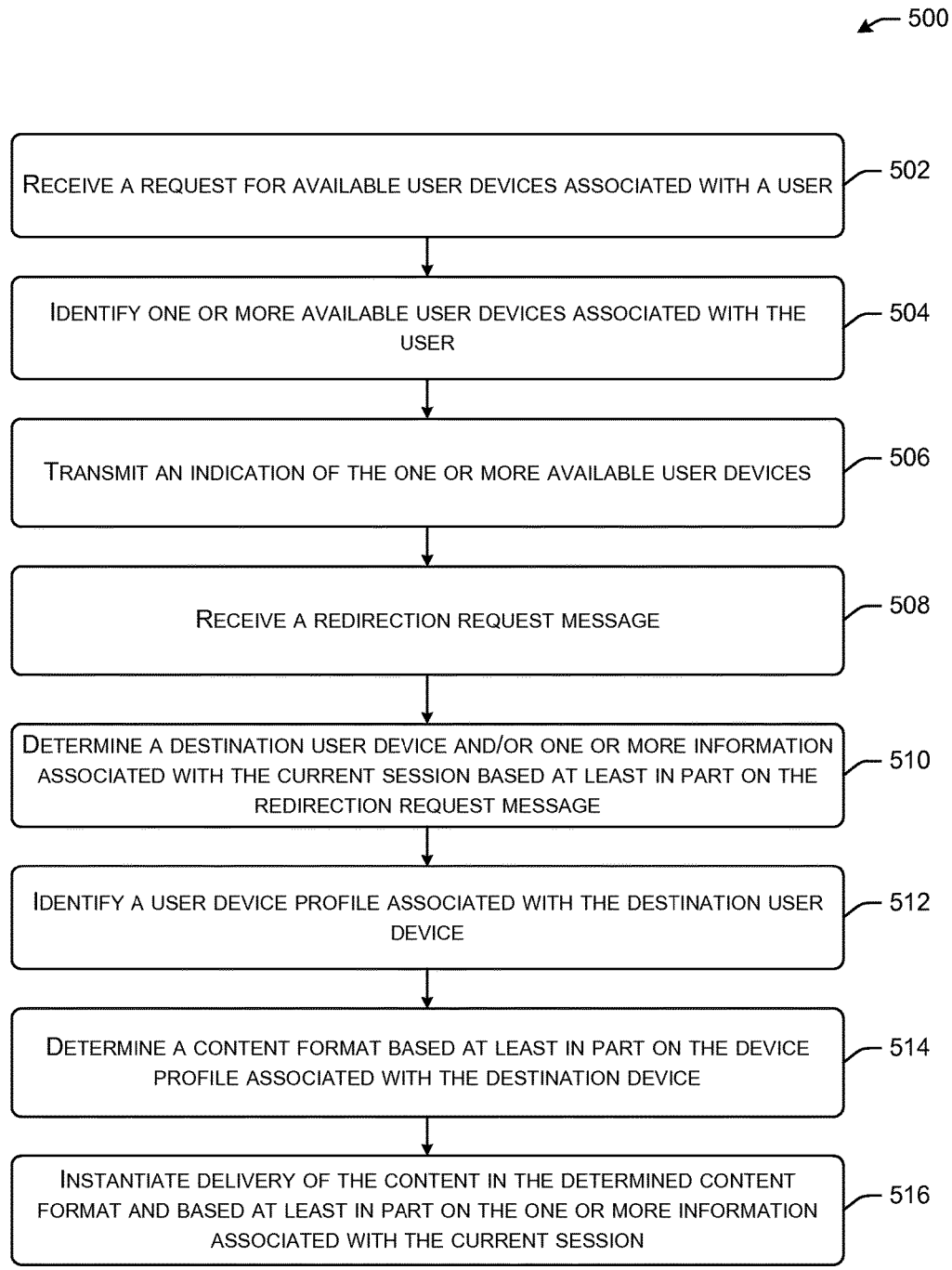
FIG. 5 is a flow diagram illustrating an example method for instantiating a redirection of content from one user device to another user device in accordance with embodiments of the disclosure.

Referring now to FIG. 5, an example method 500 for instantiating a redirection of content from one user device to another user device in accordance with embodiments of the disclosure is disclosed. Method 500, in certain embodiments, may be performed by the VBO servers 170. In other embodiments, the method 500 may be performed by the application servers 168 or a combination of the application servers 168 and VBO servers 170. At block 502, a request for available user devices associated with a user may be received. As described in reference to block 406 of FIG. 4, the request for available user devices may pertain to those other user devices 120 that may be associated with the same user 110 as the first user device 120 that transmits the request for available user devices 120.

In response to the request for available user devices associated with the user 110, at block 504, one or more available user devices associated with the user may be identified. This process may, in certain embodiments, entail accessing a database of potentially available user devices 120 associated with the user 110. This database may be locally stored on the VBO servers 170, such as on the memory 320, or at a remote storage location. This database may be constructed using information provided by the user 110, such as identification of user devices that he/she owns and/or uses. Alternatively, this information may be provided to the VBO servers 170 by the user devices using any suitable mechanism and/or protocol, such as universal plug and play (UPnP). Further still, this information may be received by the VBO servers 170 from a third party service that, in part, tracks user devices 120 that may be associated with a particular user 110. Once the potentially available user devices 120 are identified, the VBO server 170 may determine if those identified potential user devices 120 are indeed currently available to receive content. This may be ascertained by the VBO servers 170 by attempting to communicate with the potentially available user devices 120 associated with the user 110. For example, the VBO servers 170 may transmit a message to each of the potentially available user devices 120, such as via the CDN 140, CMTS 130, and/or the gateway 128, that solicits a response indicating if the potentially available user device 120 is turned on and in a state where it may be able to render content. A particular potentially available user device 120 may not respond to the communication if it is not turned on or otherwise available. Additionally, a potentially available user device 120 may respond with an indication that it is not available to render content if that user device 120 is otherwise engaged in functions that may preclude that user device 120 from rendering content to the user 110. For example, a potentially available user device 120 that is currently rendering a different content to a different user may indicate that it is not currently available to render content. Alternatively, the user device 120 may advertise its presence information to the VBO servers 170 and/or other user devices 120.

At block 506, an indication of the one or more available user devices may be transmitted. This transmission may be from the VBO servers 170 to the first user device 120 via any suitable communicative link, such as via the CDN 140 and/or the CMTS 130. The indication of the one or more available user devices 120 may be transmitted in the form of one or more data packets, where the data packets may carry identification information related to each of the available one or more user devices 120.

It will be appreciated that in certain embodiments, the processes of blocks 502, 504, 506 may be optional. In these embodiments, identifying the other available user devices 120 associated with the user 110 to which content may be directed may not involve the VBO servers 170. For example, the first user device 120 may identify other user devices 120 associated with the same user 110 to which content may be redirected without soliciting this information from the VBO servers 170.

At block 508, a redirection request message may be received. The redirection request message may be received by the VBO servers 170 from the first user device 120. This redirection request message may include information pertaining to the selected destination user device 120 that was selected by the user 110 from among the available user devices 120 associated with the user 110 to which content may be directed. The redirection request message may further include information pertaining to the current session of rendering the content. For example, the current session information may include a bookmark indicating the content that has already been rendered to the user 110 on the first user device 120.

At block 510, a destination user device and/or one or more information associated with the current session may be determined based at least in part on the received redirection request message. In one aspect, the VBO server 170 and the processors 312 thereon may parse the received data packets that constitute the redirection request message to identify the session related information and the destination device 120 identifier. This information may be used subsequently for various aspects of instantiating the redirection of the content from the first user device 120 to the destination user device 120. For example, the information may be used to identify possible formats of the content and selection of an appropriate format for the destination user device 120.

At block 512, a user device profile associated with the destination user device may be identified. The user device profile may be stored in one or more databases, such as a user device database that may be stored in the memory of the VBO server 170 or on a remote storage device. The user device profile may include information about the selected destination user device 120 that may be useful for providing content to the selected destination user device 120. At block 514, a content format based at least in part on the user device profile associated with the destination device may be determined. The content format may be appropriate for rendering on the destination user device 120. For example, the content format may have an aspect ratio, resolution, bit rate, and other parameters that may be suited to the destination user device 120 based on information accessed from the user device profile.

At block 516, delivery of the content in the determined content format and based at least in part on the one or more information associated with the current session may be instantiated. The VBO server 170 may provide content, destination user device identification, and content format information to the CDN 140 to enable the CDN 140 and the origin servers 164 to provide the content to the selected destination user device 120.

It should be noted, that the method 500 may be modified in various ways in accordance with certain embodiments of the disclosure. For example, one or more operations of method 500 may be eliminated or executed out of order in other embodiments of the disclosure. Additionally, other operations may be added to method 500 in accordance with other embodiments of the disclosure.

Figure 6:
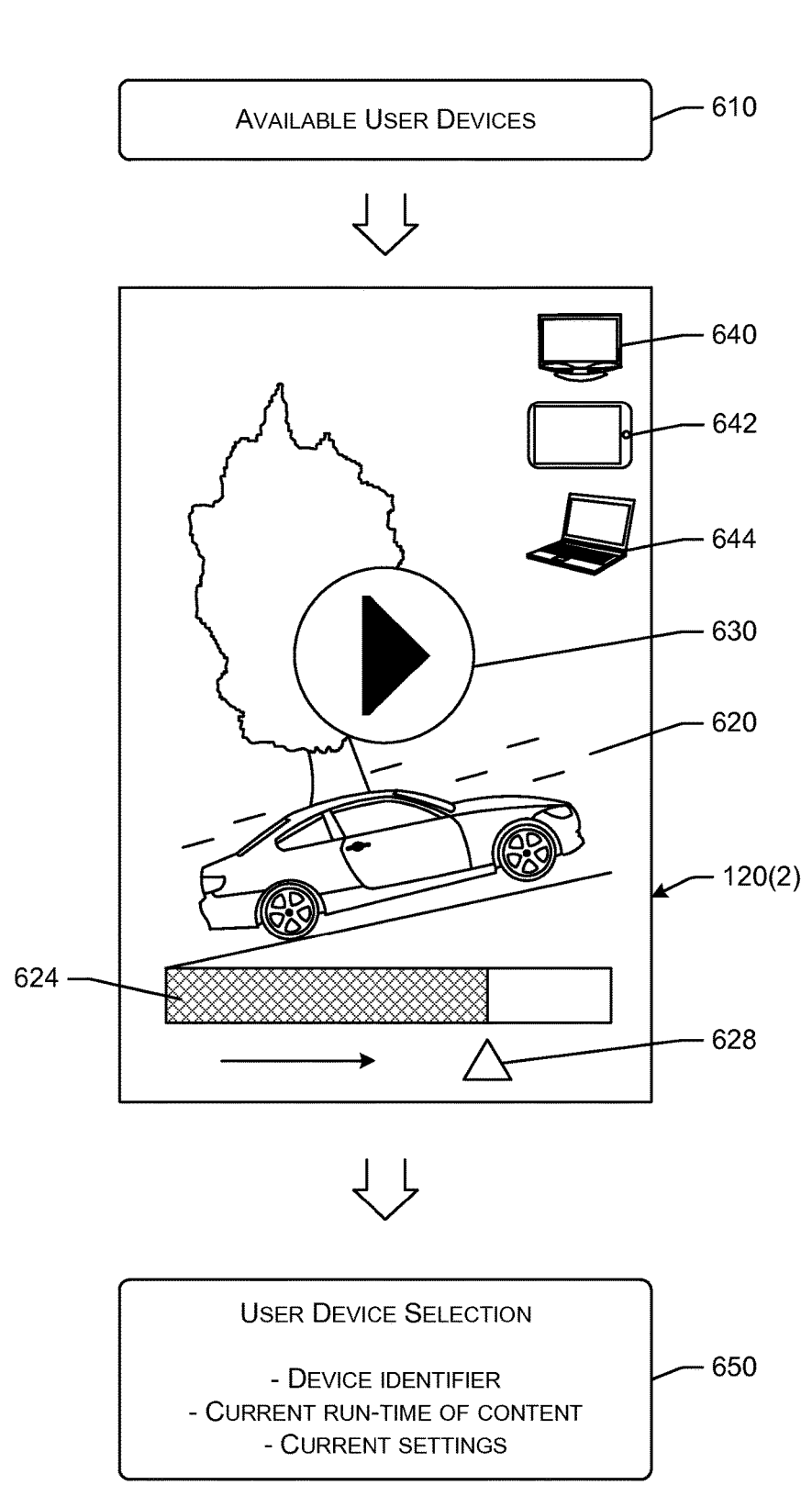
FIG. 6 is a simplified diagram illustrating a user interface on a user device for redirecting content in accordance with embodiments of the disclosure.

Referring now to FIG. 6, a user interface on a user device 120(2) for redirecting content in accordance with embodiments of the disclosure is discussed. A current user device 120(2) may receive information pertaining to available user devices 610 to which content may be redirected. This information of the available user devices 120(2) may be acquired locally at the current user device or received from a remote entity, such as the VBO servers 170. The user device 120(2) may render the content on a display screen 620 of the user device 120(2). The display screen 620 may further include an indication of how much of the content has already been rendered, such as with a percentage bar 624 and/or content pointer 628. The display screen 620 may further still provide an indication of the current state of the rendering of the content. For example, as depicted, a play button 630 may be displayed on the display screen 620 to indicate that the rendering of the content is currently paused. Indeed, in certain embodiments, the rendering of content may be paused during the time when the user 110 interacts with the user device 120 to redirect the content to another user device 120 associated with the user 110.

The display screen 620 of the current user device 120(2) may yet further display indicia 640, 642, 644 corresponding to other user devices 120 associated with the user 110 that may be available to accept the currently displayed content from the current user device 120(2). For example, the indicia 640 may correspond to the user's television, the indicia 642 may correspond to the user's tablet computing device, and the indicia 644 may correspond to the user's laptop computer. The user 110 may select one of the indicia 640, 642, 644 and the respective corresponding user device may be identified as selected by the user 110. Once one of the available user devices 120 is selected, the current user device 120(2) may generate the redirection request message 650 including a device identifier of the selected user device 120 to which content is to be directed, the current run-time (i.e. bookmark) of the content, and other current settings associated with the rendering of the content on the current user device 120.

Figure 7:
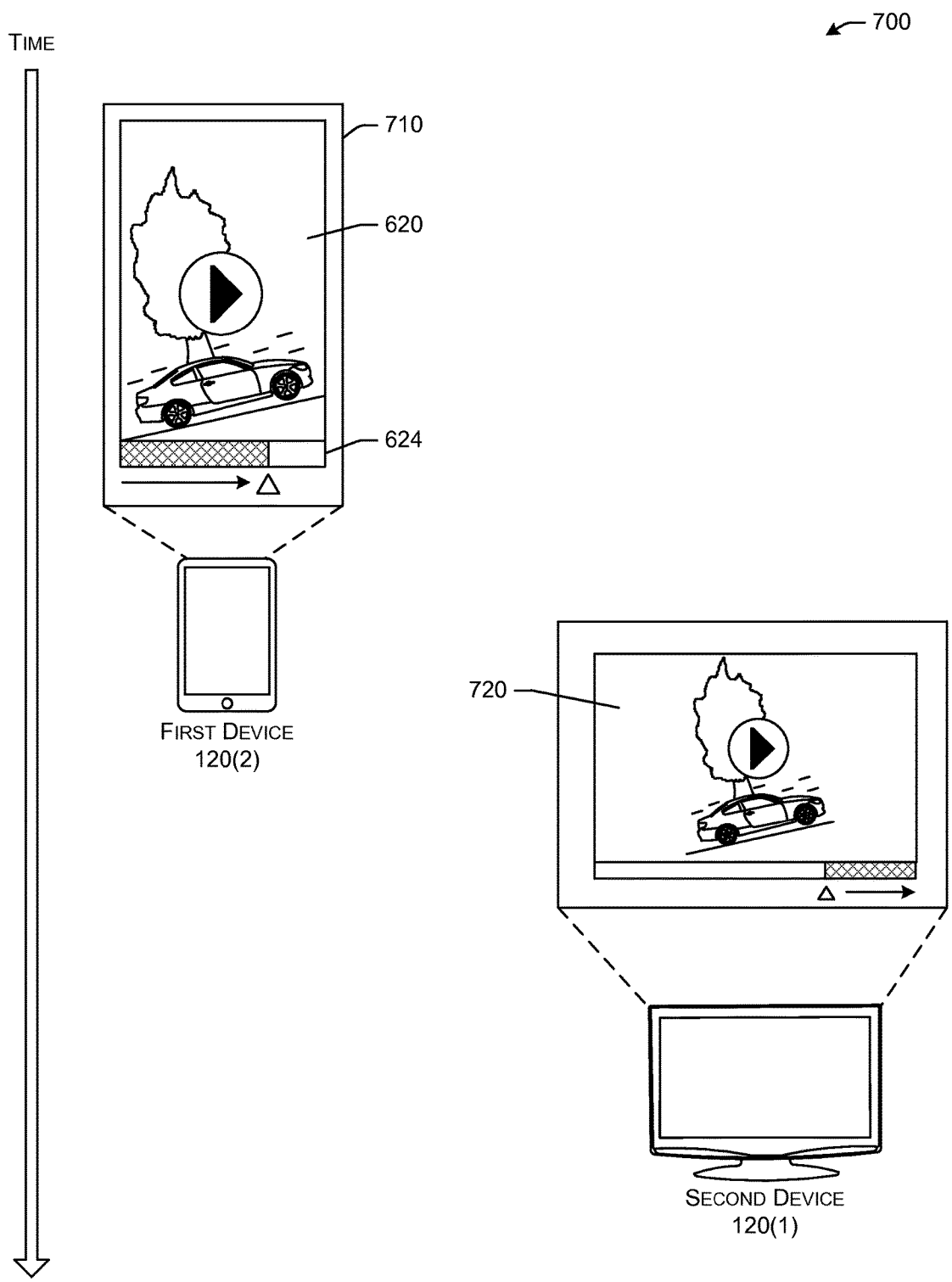
FIG. 7 is a simplified diagram illustrating a redirection of content from one user device to another user device in accordance with embodiments of the disclosure.

Referring now to FIG. 7, a redirection of content from one user device 120(2) to another user device in accordance with embodiments of the disclosure is discussed. As indicated, at some point in time, the content may be redirected from the first user device 120(2) to the second user device 120(1) and displayed on the display screen 720 of the second user device 120(1). The redirection of the content may be based at least in part on the format of the second user device 120(1). As depicted, the format, such as the aspect ratio and other format elements, may be different between the first user device 120(2) and the second user device 120(1). Therefore, the identification of the selected second user device 120(1) and ascertaining content format information by the VBO servers 170, based at least in part on a user device profile associated with the second user device 120(1), may enable the CDN 140 to provide the correct content profile to the second user device 120(1). Additionally, the session information may be used by the VBO servers 170 to provide a seamless experience to the user 110 when the content is redirected to the second user device 120(1). For example, the content is rendered on the second user device 120(1) from the same point in the rendering of the content on the first user device 120(2) as where the redirection of the content was performed. In this case, the session based information may be provided to the CDN 140 to provide content form the point where the user left off viewing on the first user device 120(2). In the case of streaming media, the CDN 140 and/or the origin servers 164 may provide a manifest file for the content to the second user device 120(1) with content segments that start from or near the point where the user 110 stopped watching the content on the first user device 120(2).

Embodiments described herein may be implemented using hardware, software, and/or firmware, for example, to perform the methods and/or operations described herein. Certain embodiments described herein may be provided as a tangible machine-readable medium storing machine-executable instructions that, if executed by a machine, cause the machine to perform the methods and/or operations described herein. The tangible machine-readable medium may include, but is not limited to, any type of disk including floppy disks, optical disks, compact disk read-only memories (CD-ROMs), compact disk rewritable (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of tangible media suitable for storing electronic instructions. The machine may include any suitable processing or computing platform, device or system and may be implemented using any suitable combination of hardware and/or software. The instructions may include any suitable type of code and may be implemented using any suitable programming language. In other embodiments, machine-executable instructions for performing the methods and/or operations described herein may be embodied in firmware. Additionally, in certain embodiments, a special-purpose computer or a particular machine may be formed in order to identify actuated input elements and process the identifications.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

While certain embodiments of the invention have been described in connection with what is presently considered to be the most practical and various embodiments, it is to be understood that the invention is not to be limited to the disclosed embodiments, but on the contrary, is intended to cover various modifications and equivalent arrangements included within the scope of the claims. Although specific terms are employed herein, they are used in a generic and descriptive sense only, and not for purposes of limitation.

This written description uses examples to disclose certain embodiments of the invention, including the best mode, and also to enable any person skilled in the art to practice certain embodiments of the invention, including making and using any devices or systems and performing any incorporated methods. The patentable scope of certain embodiments of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A method, comprising:
    identifying, by a first user device comprising one or more processors, one or more second user devices;
    rendering, by the first user device, a first respective indicia corresponding to each of the one or more second user devices, wherein:
        the first user device is a managed user device that is connected to a content delivery network via a cable connection, and
        the one or more second user devices are at least one of a managed user device or an unmanaged user device that is connected to the content delivery network via a gateway;
    receiving, by the first user device, a selection of a user device of the one or more second user devices, based at least in part on a detected input associated with at least one of the corresponding indicia;
    generating, by the first user device, a redirection request message based at least in part on the selection of the user device from the one or more second user devices, and information associated with a rendering of content by the first user device, wherein the information corresponds to:
        a profile associated with the user device, wherein the profile includes content information about rendering the content on the user device, the content information comprises one or more of:
            an aspect ratio of the user device,
            resolution of the user device,
            frame refresh frequency of the user device, or
            content transfer bit rate of the user device;
    rendering, by the first user device, a second respective indicia corresponding to one or more commands to control content corresponding to the redirection request message;
    receiving, by the first user device, a selection of a command corresponding to the second respective indicia; and
    transmitting, by the first user device, the redirection request message and the command.

2. The method of claim 1, further comprising receiving, by the first user device, an indication of redirection of content.

3. The method of claim 1, wherein the first user device is an unmanaged user device and the one or more second user devices are at least one of: a managed user device; or an unmanaged user device.

4. The method of claim 1, wherein identifying the one or more second user devices comprises:
    transmitting, by the first user device, a request for identification of the one or more second user devices; and
    receiving, by the first user device, an indication of the one or more second user devices.

5. The method of claim 1, further comprising displaying, by the first user device, a content on a display screen of the first user device.

6. The method of claim 5, wherein rendering the respective indicia corresponding to each of the one or more second user devices comprises pausing the displaying of the content on the display screen.

7. The method of claim 1, wherein rendering the respective indicia corresponding to each of the one or more second user devices comprises displaying a respective icon corresponding to each of the one or more second user devices on a display screen of the first user device.

8. The method of claim 1, further comprising identifying, by the first user device, one or more session information associated with displaying, by the first user device, a content on a display screen of the first user device.

9. The method of claim 8, wherein generating a redirection request message further comprises generating, by the first user device, the redirection request message based at least in part on the one or more session information.

10. A system, comprising:
    a display screen configured to display content;
    at least one memory that stores computer-executable instructions;
    at least one processor configured to access the at least one memory, wherein the at least one processor is configured to execute the computer-executable instructions to:
        display a content on the display screen;
        receive an indication of redirection of the content;
        identify one or more available user devices, wherein the one or more available user devices are at least one of a managed user device that is connected to a content delivery network via a cable connection or an unmanaged user device that is connected to the content delivery network via a gateway;
        render a first respective indicia corresponding to each of the one or more available user devices;

receive a selection of at least one of the one or more available user devices based at least in part on a detected input associated with at least one of the corresponding indicia;
generate a redirection request message based at least in part on:
the selection of the at least one of the one or more available user devices, and
information associated with a rendering of the content, wherein the information corresponds to:
a profile associated with the user device, wherein the profile includes content information about rendering the content on the user device, the content information comprises one or more of:
an aspect ratio of the user device,
resolution of the user device,
frame refresh frequency of the user device, or
content transfer bit rate of the user device;
render a second respective indicia corresponding to one or more commands to control content corresponding to a redirection request message;
receive a selection of a command corresponding to the second respective indicia; and
identify one of more session information based at least in part on the display of the content on the display screen;
transmit a redirection request message, based at least in part on:
the selection of the user device of the one or more user devices,
the one or more session information, and
the command.

11. The system of claim 10, wherein the one or more available user devices comprises at least one of: a tablet computing device; a smartphone; a netbook computer; a laptop computer; a set-top box; a television; a desktop computer; or a content recording device.

12. The system of claim 10, wherein the at least one processor is further configured to execute the computer-executable instructions to receive an indication of the one or more available user devices from a video back office server.

13. The system of claim 10, wherein the one or more session information comprises at least one of: a bookmark of the content already rendered during a current session; volume settings associated with the current session; brightness settings associated with the current session; or contrast settings associated with the current session.

14. A method, comprising:
receiving, by a video back office server comprising one or more processors, a redirection request message and a command;
determining, by the video back office server and based at least in part on the redirection request message and the command, a destination user device and one or more session related information, wherein the destination user device is at least one of a managed user device that is connected to a content delivery network via a cable connection or an unmanaged user device that is connected to the content delivery network via a gateway;
identifying, by the video back office server and based at least in part on the destination user device, one or more format information associated with the destination user device, and a profile associated with the destination user device, wherein the profile comprises content information about the reproduction of content on the destination user device, the content information comprises one or more of:
an aspect ratio of the user device,
resolution of the user device,
frame refresh frequency of the user device, or
content transfer bit rate of the user device; and
instantiating, by the video back office, content delivery to the destination user device based at least in part on the one or more format information and the one or more session information.

15. The method of claim 14, wherein the one or more session information comprises at least one of: a bookmark of the content already rendered during a current session; volume settings associated with the current session; brightness settings associated with the current session; or contrast settings associated with the current session.

16. The method of claim 14, wherein identifying one or more format information associated with the destination user device comprises accessing a user device database.

17. The method of claim 14, further comprising:
receiving, by the video back office server from a first user device, a request for identification of one or more second user devices; and
transmitting, by the video back office server to the first user device, an indication of one or more second user devices.

18. A system, comprising:
at least one memory that stores computer-executable instructions;
at least one processor configured to access the at least one memory, wherein the at least one processor is configured to execute the computer-executable instructions to:
receive a redirection request message, and a command;
determine, based at least in part on the redirection request message and the command, a destination user device and one or more session related information, wherein the destination user device is at least one of a managed user device that is connected to a content delivery network via a cable connection or an unmanaged user device that is connected to the content delivery network via a gateway;
identify, based at least in part on the destination user device, one or more format information associated with the destination user device, and a profile associated with the destination user device, wherein the profile comprises content information about the reproduction of content on the destination user device, the content information comprises one or more of:
an aspect ratio of the user device,
resolution of the user device,
frame refresh frequency of the user device, or
content transfer bit rate of the user device; and
instantiate content delivery to the destination user device based at least in part on the one or more format information and the one or more session information.

19. The system of claim 18, wherein the one or more session information comprises at least one of: a bookmark of the content already rendered during a current session; volume settings associated with the current session; brightness settings associated with the current session; or contrast settings associated with the current session.

20. The method of claim 1, wherein the redirection request message is sent to the video back office server using at least one of: a digital storage media command and control protocol; or a real time streaming protocol.

* * * * *